(12) United States Patent
Roedseth

(10) Patent No.: US 7,249,622 B2
(45) Date of Patent: Jul. 31, 2007

(54) TIRE WITH DEEP TREAD GROOVES

(75) Inventor: John Kolbjoern Roedseth, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 407 days.

(21) Appl. No.: 10/736,163

(22) Filed: Dec. 15, 2003

(65) Prior Publication Data
US 2005/0126669 A1  Jun. 16, 2005

(51) Int. Cl.
*B60C 3/00* (2006.01)
*B60C 17/04* (2006.01)
*B60C 11/13* (2006.01)
*B60C 5/00* (2006.01)
*B60C 19/00* (2006.01)

(52) U.S. Cl. .................. 152/209.6; 152/158; 152/185; 152/196; 152/209.26; 152/454; 152/520

(58) Field of Classification Search ................ 152/196, 152/209.26, 454, 167, 169, 197, 173, 175–177, 152/185, 187–189, 209.19, 209.6, 209.22, 152/158, 520
See application file for complete search history.

(56) References Cited

U.S. PATENT DOCUMENTS

| 1,293,528 A | * | 2/1919 | Palmer | ............. 152/209.26 X |
| 2,691,335 A | * | 10/1954 | Murray | .................. 152/454 X |
| 3,830,273 A |  | 8/1974 | Boileau | |
| 5,411,069 A |  | 5/1995 | Tsuda | |
| 5,421,390 A |  | 6/1995 | Gerard et al. | |
| 5,645,658 A |  | 7/1997 | Gerard et al. | |
| 5,685,927 A |  | 11/1997 | Hammond et al. | |
| 6,470,935 B1 |  | 10/2002 | Fulsang | |

FOREIGN PATENT DOCUMENTS

| DE | 3916711 | | 11/1990 | |
| DE | 296 07 231 U1 | * | 7/1996 | |
| EP | 0465786 | | 1/1992 | |
| EP | 1022162 | | 7/2000 | |
| FR | 607.026 | * | 6/1926 | ................. 152/454 |
| FR | 2702180 | | 9/1994 | |
| GB | 15002 | * | 0/1896 | ................. 152/176 |
| JP | 05229302 A | * | 9/1993 | ............ 152/209.26 |
| JP | 05229303 A | * | 9/1993 | ............ 152/209.26 |
| JP | 6286404 | | 10/1994 | |
| JP | 6286405 | | 10/1994 | |
| JP | 08318715 A | * | 12/1996 | |
| JP | 2003335109 A | * | 11/2003 | |
| WO | 9014239 | | 11/1990 | |
| WO | WO-95/18022 A1 | * | 7/1995 | |

* cited by examiner

*Primary Examiner*—Adrienne C. Johnstone
(74) *Attorney, Agent, or Firm*—Nancy T. Krawczyk

(57) ABSTRACT

A tire is manufactured on standard tire building equipment and cured in standard curing presses. The tire tread has at least one deep circumferentially extending groove. Within the groove is a separately assembled ring. The ring may be fitted into the deep groove after vulcanization of the tire. For very wide tires, two grooves with two external rings may be used or more than two grooves and beads, depending upon the tire width.

11 Claims, 9 Drawing Sheets

TIRE WITH DEEP TREAD GROOVES

FIELD OF THE INVENTION

The present invention is directed to a pneumatic tire. More specifically, the present invention is directed to a pneumatic radial tire tread. The tread has at least one deep tread groove that divides the tire into virtual multiple treads. Inextensible bead rings are placed in the groove following vulcanization of the tire.

BACKGROUND OF THE INVENTION

Many attempts have been made to design tires that have superior performance on wet roads and which significantly reduce the aquaplaning phenomena at high speed on water covered roads. Well known examples are the Goodyear Aquatread (U.S. Pat. No. 4,687,037), the Michelin Catamaran (European Pat. App. EP 465,786 A1), and dual or multi-tire wheels. However, large grooved tires, such as the Goodyear Aquatread have reduced anti-aquaplaning as the tread wears.

The predecessor development tire to the Catamaran was disclosed in U.S. Pat. No. 3,830,273 entitled Dual Tire. This early tire suffered from poor handling and ride problems and therefore was never commercially accepted. The primary feature of this tire was the employment of a third bead centrally disposed between two tread portions reinforced by belts. The use of three or more beads was not in itself novel and had been employed in several very early patented tires. However, the use of a third bead coupled with a large channel was new. EPO application publication No. 0613793A1 describes an improved third bead structure designed specifically to improve the handling characteristics of the Catamaran type tire.

Later patents have sought to improve upon the teachings regarding a third bead coupled with a large channel, see U.S. Pat. No. 5,645,658, EP 465786, JA 62-86404, and JA 62-86405. All of these patent teach placing the third bead core coupled with the large channel within the tire; i.e. incorporating the third bead core into the tire during the green building stage of the tire, prior to vulcanization. However, such a method of construction requires new and more complex building processes to permit the use of an inextensible bead ring at a location radially inward of the belt plies. Thus, the manufacturing of the tire is very complex and costly in regards to capital investment.

SUMMARY OF THE INVENTION

The present invention is directed to a tire with a deep groove in the tire tread, the tire being manufactured on standard tire building equipment and cured in standard curing presses. A ring is fitted into the molded groove after vulcanization of the tire. For very wide tires, two grooves with two external rings may be used or more than two grooves and beads, depending upon the tire width.

More specifically, the present invention is directed to a pneumatic radial tire comprising an annular tread. At least one pair of reinforcing belts is located radially inwardly of the tread. The tire also has a pair of sidewalls, each sidewall extending radially inwardly from each lateral tread edge. A tire carcass structure forming the tire has a pair of bead cores with each bead core being located radially inwardly from each sidewall and a carcass reinforcing ply structure radially inward of the reinforcing belts extending circumferentially about the tire from one of the pair of bead cores to the other one of the pair of bead cores. The tread has at least one circumferentially extending groove and a pair of lateral tread edges wherein the axial distance between the lateral tread edges defines the tread width. Located within at least one circumferentially extending grooves is a circumferentially extending ring. The circumferentially extending ring is radially inward of the reinforcing belts.

In accordance with one aspect of the invention, the groove in which the circumferentially extending ring is located has a base defining the bottom of the groove. The groove base is radially inward of the reinforcing belts.

In accordance with another aspect of the invention, the circumferentially extending groove, in which is located the circumferentially extending ring, extends into the tire cavity by a depth D of 10-30% of the tire sectional height H.

In another aspect of the invention, the tire tread may be provided with at least two grooves that contain therein a circumferentially extending ring. The rings in each groove are radially inward any reinforcing belt plies of the tire. If the tire is characterized by at least two such grooves, than the tire has three sets of reinforcing belts with each of the reinforcing belt sets being separated by one of the circumferentially extending grooves.

In another aspect of the invention, the circumferentially extending ring is comprised of a material selected from the group consisting of thermoplastic, thermoelastomer, or plasticized elastomer. The reinforcing material embedded in the ring may be selected from the group consisting of steel, carbon fiber, fiberglass, aramid, a nylon, or a polyester. The ring may also have secondary functions, such as incorporating reflective or fluorescent materials to provide special effects to the tire.

The tire may be manufactured as either a standard tire or a run-flat tire, of the self-supporting type tire, or a PAX System type tire.

Thus, in another aspect of the inventive tire, the tire has run flat capabilities provided by a pair of sidewall fillers. At least one filler is located in each sidewall and extending from a location radially inward of the lateral tread edges to radially outward of the bead cores.

Also disclosed is a run-flat tire assembly comprising a tire, a tire wheel upon which the tire is mounted forming a tire cavity, and a tire support ring mounted on the tire wheel inside the tire cavity. The tire has a tread defined by a pair of lateral tread edges, the axial distance between the lateral tread edges defining the tread width. The tread has at least one circumferentially extending groove. Within the groove is a circumferentially extending ring, the ring comprising a coated inextensible material and being radially inward of the at least one pair of reinforcing belts. The tire support ring may be provided with a continuous circumferential groove on the radially outer surface. The support ring groove and the tread groove containing the circumferentially extending ring may be radially aligned such that when the inner surface of the tire tread rests on the tire support ring during underinflated operation of the tire assembly, the tread groove and ring there rests within the support ring groove.

DEFINITIONS

The following definitions are controlling for the disclosed invention.

"Axial" and "axially" mean lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim. The radially inner beads are associated with holding the tire to the wheel rim.

"Belt structure" means at least two annular layers or plies of parallel cords, woven or unwoven, underlying the tread, unanchored to the bead, and having both left and right cords angles in the range from 17° to 27° with respect to the equatorial plane of the tire.

"Carcass" means the tire structure apart from the belt structure, tread, base tread, and sidewall rubber over the plies, but including the beads.

"Lateral" means an axial direction.

"Lateral Edge" means the axially outermost edge of the tread as defined by a plane parallel to the equatorial plane and intersecting the outer ends of the axially outermost traction lugs at the radial height of the inner tread surface.

"Nonskid" means the depth of the grooves in a tire tread.

"Outer" means toward the tire's exterior.

"Ply," unless otherwise specified, means a continuous layer of rubber-coated parallel cords.

"Radial" and "radially" are used to mean directions radially toward or away from the axis of rotation of the tire.

"Shoulder" means the upper portion of sidewall just below the tread edge, effects cornering. Tread shoulder or shoulder rib means that portion of the tread near the shoulder.

"Tread" means a molded rubber component which, when bonded to a tire casing, includes that portion of the tire that comes into contact with the road when the tire is normally inflated and under normal load.

BRIEF DESCRIPTION OF THE DRAWINGS

The invention will be described by way of example and with reference to the accompanying drawings in which.

DETAILED DESCRIPTION OF THE INVENTION

The following language is of the best presently contemplated mode or modes of carrying out the invention. This description is made for the purpose of illustrating the general principals of the invention and should not be taken in a limiting sense. The scope of the invention is best determined by reference to the appended claims.

Figure 1:
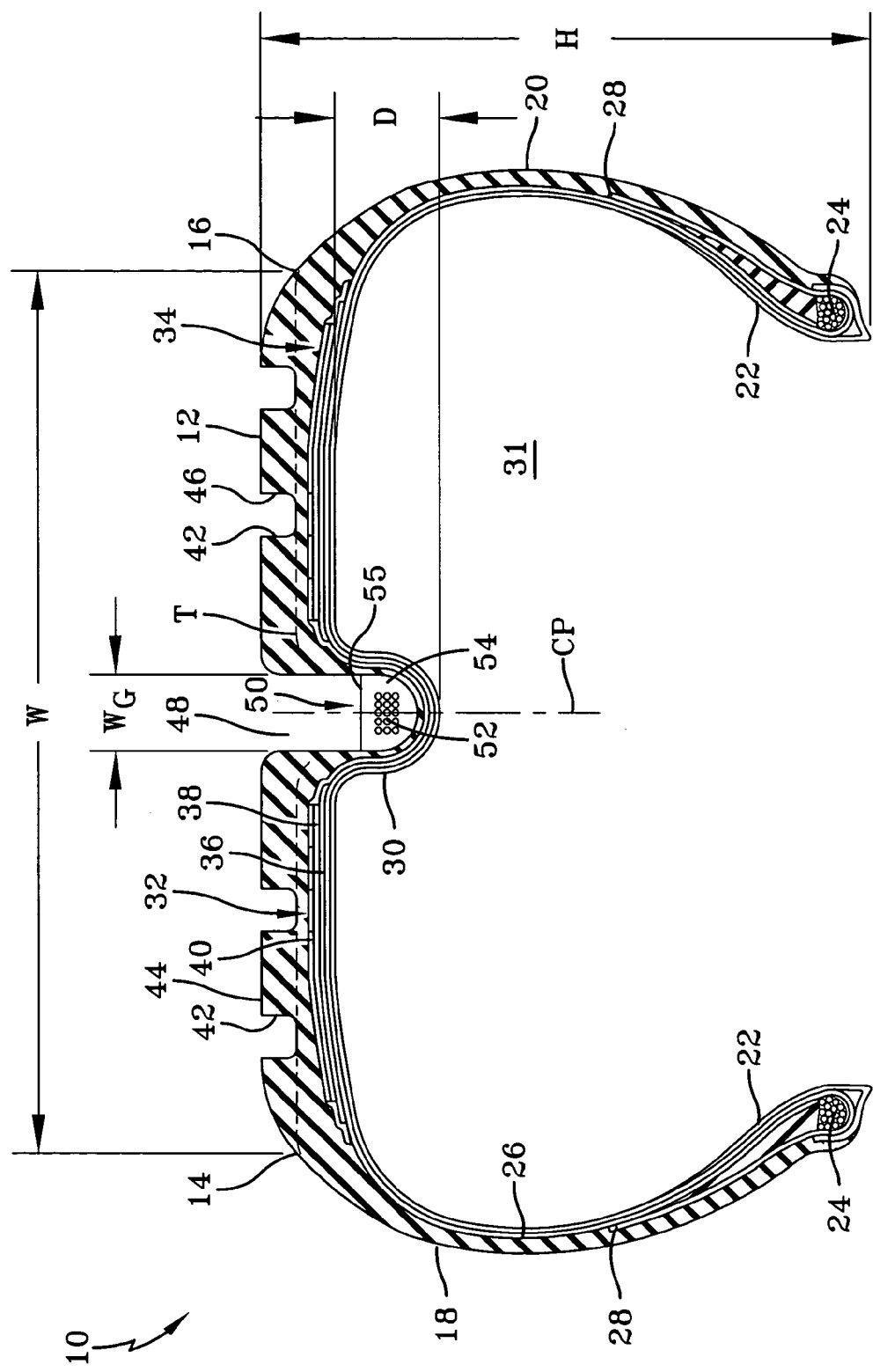
FIG. 1 is a cross-sectional view of a tire.

A passenger tire in accordance with the present invention is shown in FIG. 1. The tire 10 is provided with a ground-engaging tread portion 12 that terminates in the shoulder portions 18, 20 at the lateral edges 14,16 of the tread 12 respectively. The axial distance between the lateral tread edges 14, 16 defines the tread width W. Sidewall portions 18, 20 extends from each tread lateral edges 14,16 respectively and terminate in a pair of bead regions 22, each bead region 22 has an annular inextensible bead core 24 therein. The tire 10 is further provided with a carcass reinforcing ply structure 26 having turnup ends 28. The tire 10 may include a conventional innerliner 30 forming the inner peripheral surface of the tire 10 if the tire is to be of the tubeless type; the innerliner 30, in conjunction with a wheel when the tire is mounted, also defines the tire cavity 31.

Placed circumferentially about the radially outer surface of the carcass reinforcing structure 26 beneath tread portion 12 are two pairs of tread reinforcing belt structures 32, 34. In the particular embodiment illustrated, belt structures 32, 34 each comprise two cut belt plies 36, 38 and the cords of each belt ply 36 or 38 are oriented at equal but opposing angles with respect to the mid-circumferential centerplane of the tire. Radially outward of the belt plies 36, 38 is an overlay ply 40, comprised of cords inclined at approximately 0° to the mid-circumferential centerplane of the tire. The belt structures 32, 34 may comprise any number of belt plies, of any desired configuration and the cords may be disposed at any desired angle. Belt structures 32, 34 provide lateral stiffness across the belt width so as to minimize lifting of the tread 12 from the road surface during operation of the tire. The cords of belt plies 36, 38, 40 may be formed of any material conventionally used to form belt plies.

The carcass reinforcing structure 26 comprises at least one reinforcing ply structure. In the particular embodiment illustrated, a single reinforcing ply structure 26 extends from the first bead region 22 through a sidewall portion 18, the tread portion 12, the sidewall portion 20 to the opposing bead region 22. The carcass turn-ups 28 extend radially outward of the bead regions 22. The cords of the reinforcing ply structure 26 are oriented at an angle of at least 75 degrees with respect to the mid-circumferential centerplane CP of the tire 10. The cords may be made of any material normally used for cord reinforcement of rubber articles, for example, and not by way of limitation, rayon, nylon and polyester. Preferably, the cords are made of material having a high adhesion property with rubber and high heat resistance. While a single ply is illustrated, the carcass reinforcing structure 26 may comprise any number of carcass plies.

The tread 12 has a plurality of grooves 42 to form a tread pattern suitable for the purpose for which the tire is intended. Such grooves 42 may be laterally or circumferentially extending grooves or any combination thereof. The grooves 42 have a depth defining a non-skid depth of the tread, shown as the dashed line T.

Dividing the tread portion 12 into at least two distinct tread sections 44, 46 is a continuous circumferentially extending groove 48. The groove 48 has a depth greater than the non-skid depth T of the tread portion 12, and the base of the groove 48 is radially inward of the belt structures 32, 34. The groove 48 has a width $W_G$ of 8-20 percent of the tread width W. In the illustrated embodiment, the groove 48 is centered on the centerplane CP of the tire. The carcass reinforcing structure 26 passes beneath the groove 48, following the contour of the groove 48 due to the building method, explained further herein.

Located at the base of the groove 48 is a circumferentially extending ring 50. The ring 50 is a composite of inextensible cords 52 in a matrix 54. The upper surface 55 of the ring 50 is radially inward of the belt structures 32, 34. The ring 50 is manufactured prior to being incorporated into the groove 48. The cross-sectional configuration of the ring 50 is U-shaped. The cross-section configuration may also be circular or oval. It is desired that the ring 50 be smoothly curved where it contacts the tire groove 48. The upper surface 55 of the ring 50 may be smooth or characterized by any type of minor grooving or pattern in order to optimize or affect the water flow through the groove or prevent stone entrapment within the groove 48.

The tire 10 is built as follows using a conventional two-stage building method wherein the carcass is first assembled and the belt and tread package are separately assembled and applied to the carcass after the carcass is placed into a toroidal configuration.

The tire carcass, including the reinforcement ply 26 and the bead portions 12, is built as for any other radial tire or radial run-flat tire. The only provision required for the circumferential groove 48 is that the width between the bead cores 24 is increased compared to a conventional tire, to allow for the ply cord path around the groove 48. The carcass may be assembled on a conventional first stage building machine.

Figure 2:
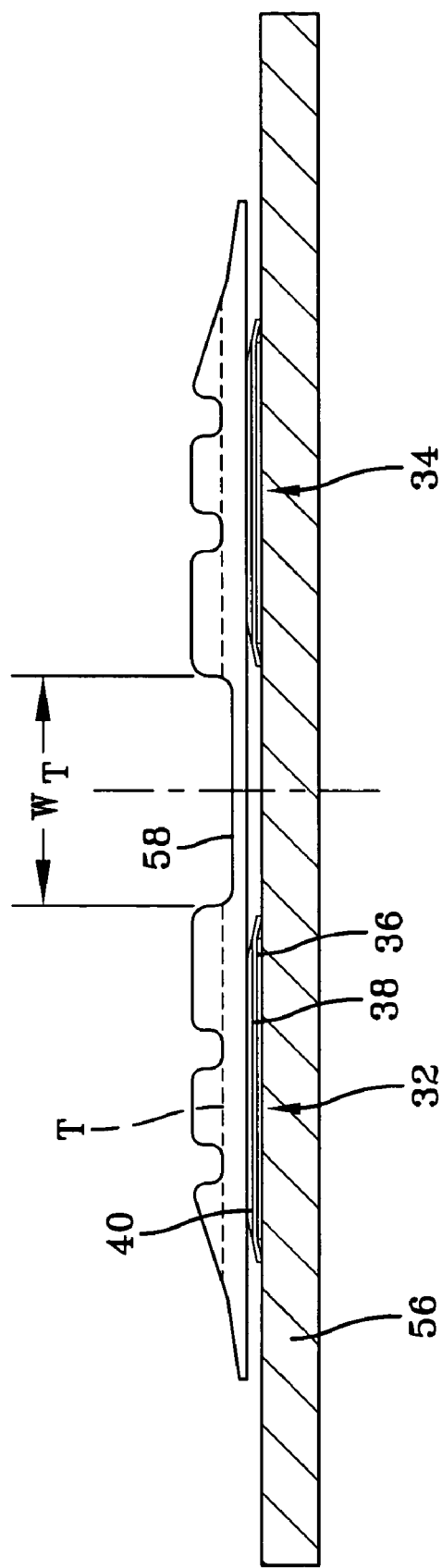
FIG. 2 is a cross-section of a belt building drum and the belt structure being built thereon.

FIG. 2 illustrates the assembly of the belt/tread package for a tire having a single deep groove 48 as seen in FIG. 1. On top of a breaker-tread drum 56, a pair of belt structures 32, 34 are placed. Each ply forming the individual plies of the belt structure 32, 34 may be applied as two parallel strips or as a singular strip joined with a gum layer. Two parallel strips are preferred, as this avoids the process of assembly plies and gum offline. Alternatively, a single ply belt fabric may be split in the breaker server to deliver two separate belt plies to the building drum 56. After the desired number of belt plies 36, 38 are applied, the overlay 40 can be applied. The overlay 40 is a cut ply or is spirally wound onto the belt plies 36, 38.

The tread portion 12 can be extruded as a single tread with a thin section 58 between the tread sections 44, 46. The width $W_T$ of the thin section 58 is a function of the depth and width of the groove 48. The thin section 58 is formed of the same elastomer as that used below the non-skid depth of the tread 12. Typically, this is a tread base compound, formulated to provide damage resistance to the tread, as opposed to increased wear resistance of the radially outer surface of the tread.

Figure 3:
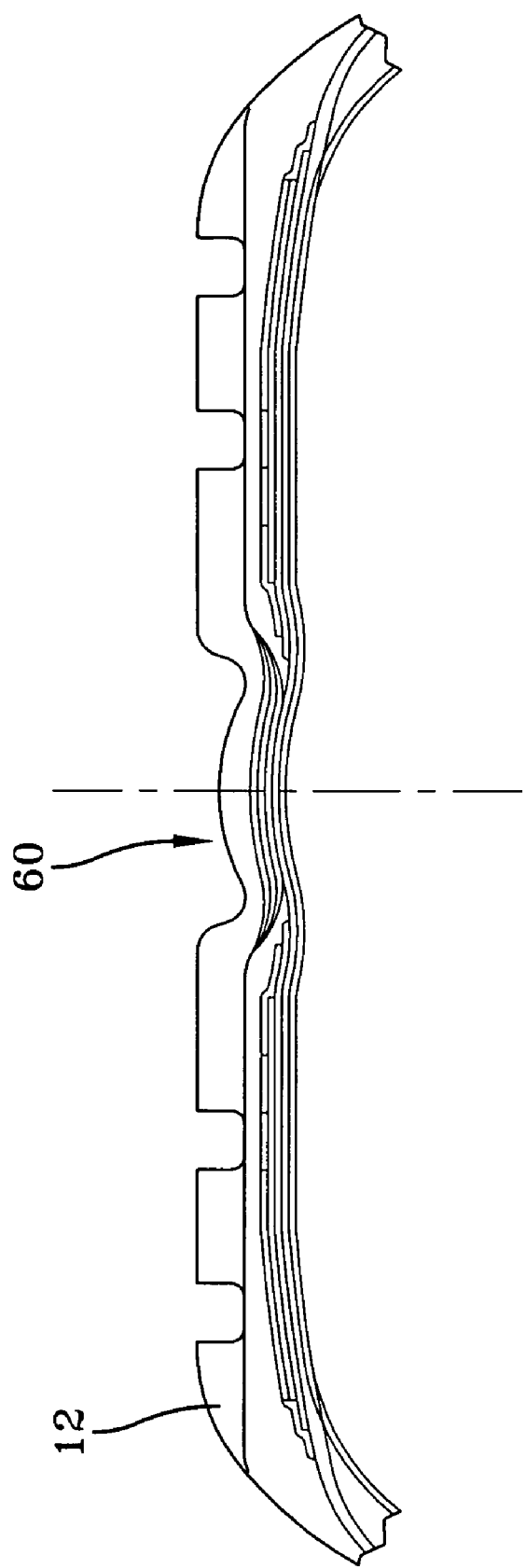
FIG. 3 is a cross-sectional view of a green tire.

After the belt/tread package has been assembled, the package is transferred to the green carcass. To assist in moving the belt/tread package to avoid displacement of the plies of the belt structures 32, 34, a thin gum layer (not illustrated) may have been applied as a first layer on the belt building drum 56, thus sandwiching the belt structures 32, 34 between the gum layer and the tread portion 12. After placement on the carcass, the belt/tread package is stitched onto the carcass. The completed green tire will be as illustrated in FIG. 3. The central area 60 of the green tire is thinner than the remaining tread portion 12 and appears as a wide groove.

Figure 4:
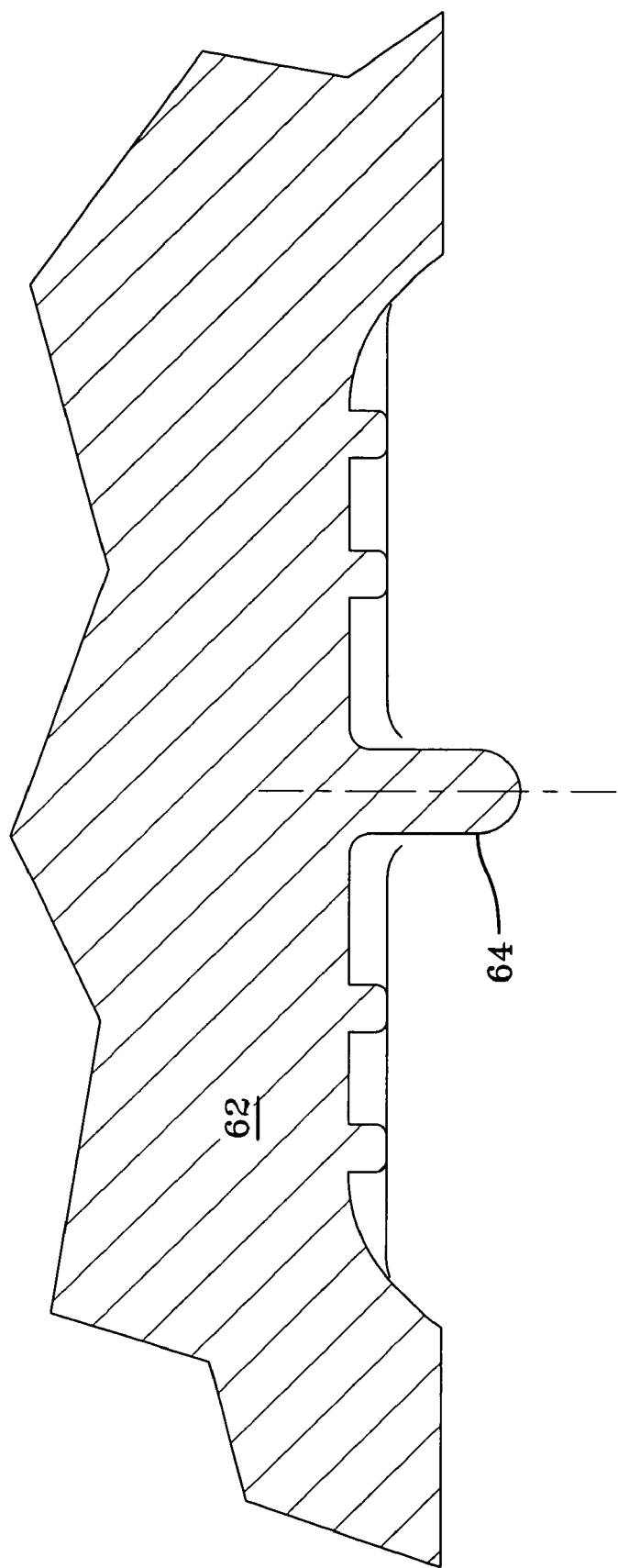
FIG. 4 is a cross-section of a portion of the mold used in curing the tire of FIG. 3.

FIG. 4 illustrates a tread mold 62 for use in curing the tire of FIGS. 1 and 3. At the centerline of the mold 62 is an extending rib 64. When the green tire of FIG. 3 is placed in a mold having the tread mold 62 of FIG. 4, the central area 60 of the green tire is forced radially inward. After curing, the previous wide central area 60 of the green tire becomes the deep groove 48 of the cured tire 10. The depth and width of the groove 48 is dictated by the shape of the mold rib 64. At a minimum, the groove extends into the tire by a depth D of 10 to 30% of the tire sectional height H.

The circumferentially extending ring 50 is manufactured and cured separate from the tire. The primary characteristics of the ring 50 are strength and light weight. The ring 50 is a composite of reinforcing cord 52 embedded in a matrix 54.

The matrix 54 may be any type of thermoplastic, thermoelastic, or plasticized elastomer. One embodiment is aramide cords embedded in polyurethane or other plastic made by filling a U-shaped plastic element with an epoxy soaked cord. Another alternative is to vulcanize steel or fabric cords in elastomer in a U-shaped mold. To provide secondary features to the tire, the matrix 54 may be compounded in such a manner as to provide reflective or fluorescent properties to the ring 50. When set into the groove 48 of the tire 10, the reflective or fluorescent ring 50 provides an additional safety feature to the tire 10.

Figure 5:
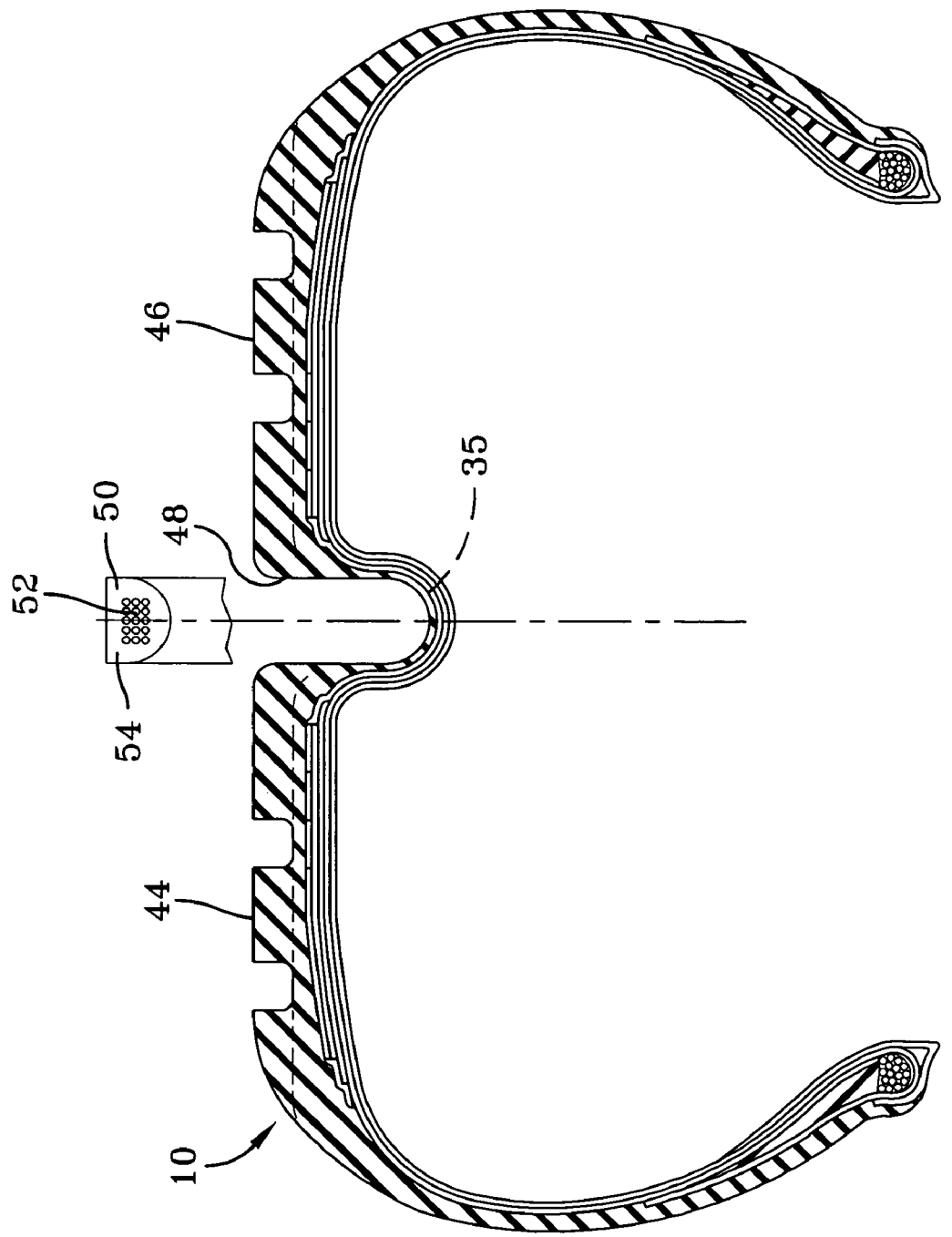
FIG. 5 is the cured tire prior to insertion of the reinforcing ring.

FIG. 5 illustrates the cured tire. The circumferentially extending ring 50 is inserted into the deep groove 48. The ring 50 is inserted into the groove 48 by compressing one tread section 44 or 46, sliding the ring 50 over the compressed tread section 44 or 46 and snapping the ring 50 into the groove 48.

Figure 6:
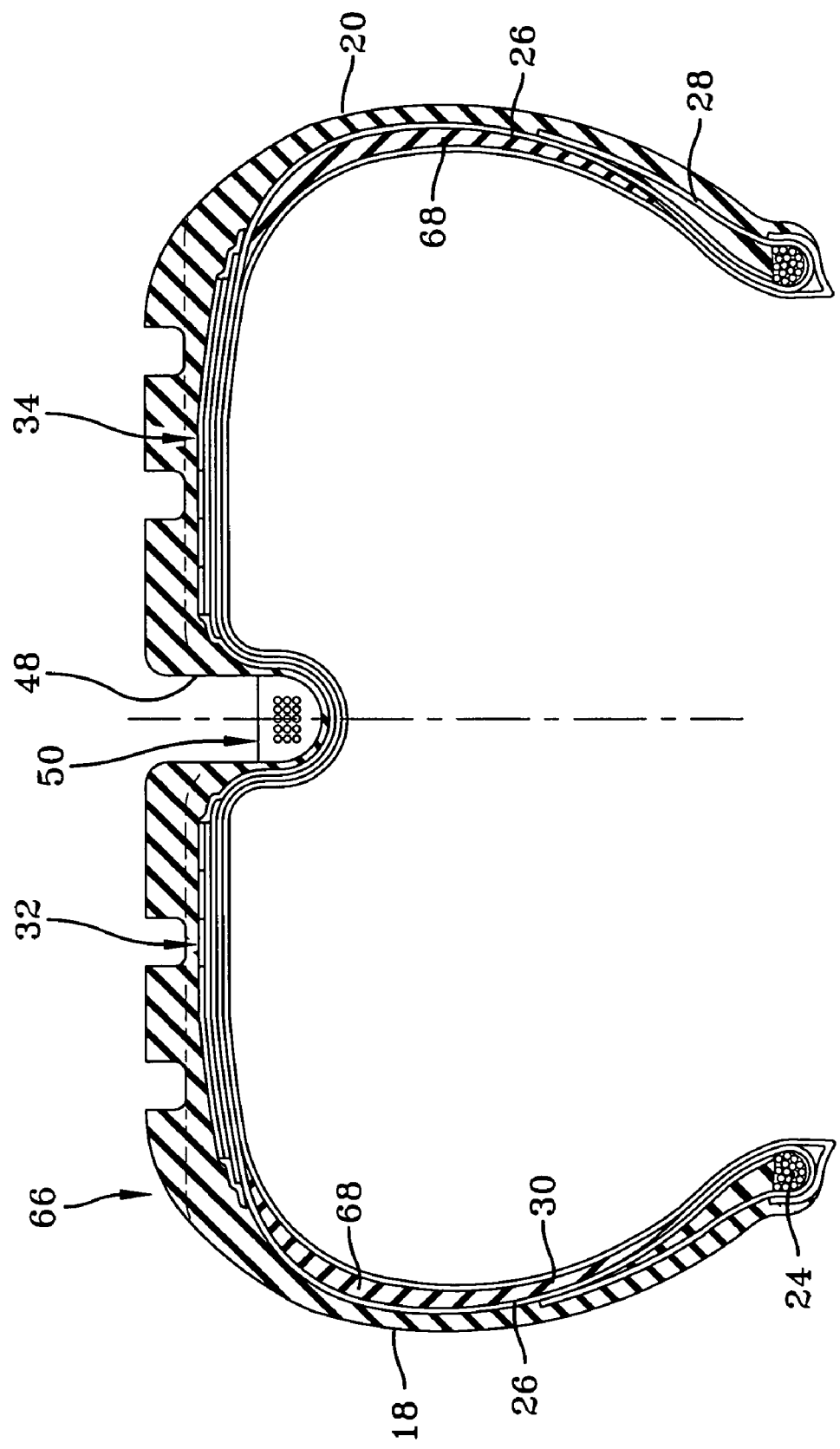
FIG. 6 is an alternative construction of the tire.

FIG. 6 is an alternative embodiment of the tire. For purposes of this application the various embodiments illustrated in FIGS. 1 and 5-8 each use the same reference numerals for similar components. The structures employ basically the same components with variations in location or quantity thereby giving rise to the alternative applications in which the inventive concept can be practiced. The depicted tire is a self-supporting run-flat tire 66. Within each sidewall 18, 20 is at least one high modulus elastomeric filler 68 disposed either between the carcass reinforcing ply structure 26 and the inner liner 30, as illustrated, or between the carcass reinforcing ply structure 26 and the turnup ends 28. The elastomeric fillers 68 extend from the radially outer portion of the bead cores 24 respectively, up into the sidewalls 18, 20, gradually decreasing in cross-sectional width. The elastomeric fillers 68 terminate at a radially outer end, preferably radially inward of the belt structures 32, 34. While only a single filler 68 is illustrated, multiple fillers, such as the type disclosed in U.S. Pat. No. 5,685,927 may be employed. In such a tire, there are at least two fillers located in each sidewall 18, 20.

The fillers 68 are characterized by having a high degree of stiffness yet by also having a relatively low hysteresis for such a degree of stiffness. The stiffness of the rubber composition for fillers 68 is desirable for stiffness and dimensional stability of the tire sidewalls 18, 20. The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, a relatively low hysteresis is desired for the rubber composition for the fillers 68.

Figure 7:
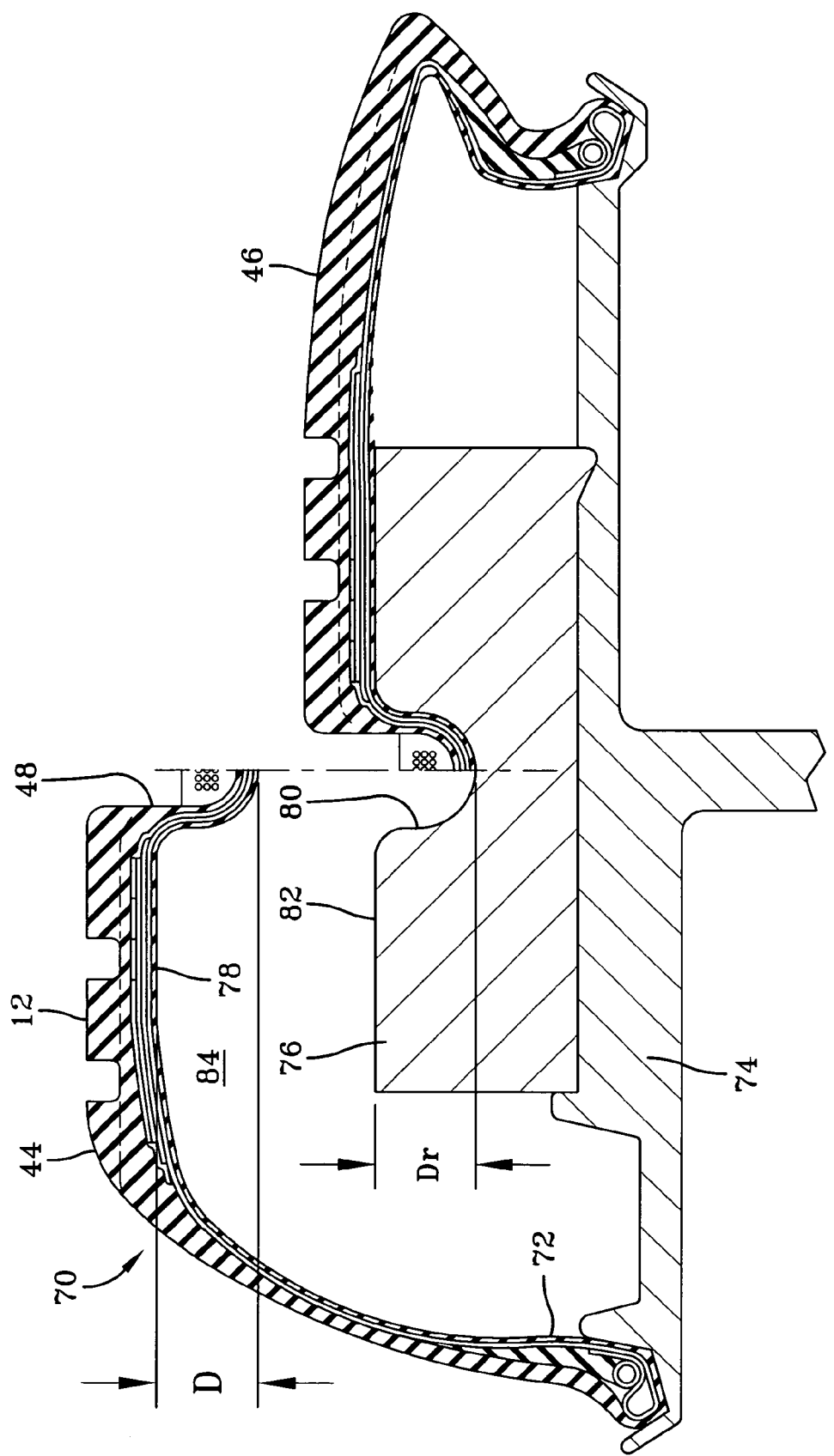
FIG. 7 is another alternative construction of the tire, showing the tire at both inflated and underinflated operating conditions.

The tire 70 of FIG. 7 is another run-flat tire of the type known as a PAX System tire. The PAX System employs a tire 70 having beads of two different diameters and a locking type bead region 72, a dual diameter wheel 74, and a support ring 76 upon which the inner surface 78 of the tire 70 rests when operated in an under-inflated condition. The tread portion 12 of the tire 70 is manufactured as discussed above, while the carcass reinforcing structure 26 and the bead regions 72 are designed in accordance with the PAX tire standards. The left side of FIG. 7 shows the PAX System tire 70 when fully inflated and the right side of FIG. 7 shows the tire when under inflated and resting on the support ring 76. To enable the tire 70 to operate in an under-inflated condition, as designed, and maintain the benefits of the dual tread sections 44, 46, the support ring 76 has a deep circumferentially continuous groove 80 on the radially outer surface 82 of the support ring 76.

The depth Dr of the groove 80 is equal to at least the radial extent D of the center of the tread portion 12 into the interior of the tire 70 into the tire cavity 84. By setting the depth Dr to at least the radial extent D, the inner surface 78 of the tire 70 will rest on the ring 76 as designed. The support ring 76 is illustrated as being centered on the wheel 74. However, the ring 76 may be offset on the wheel 74. In such a construction, the support ring groove 80 should be located on the upper surface 82 of the ring to be radially inward of the tread groove 48. Such a construction of the tire 70 and ring 76 combination assists the tire 70 in maintaining its position relative to the ring 76 when the tire is operated in an under-inflated condition.

Figure 8:
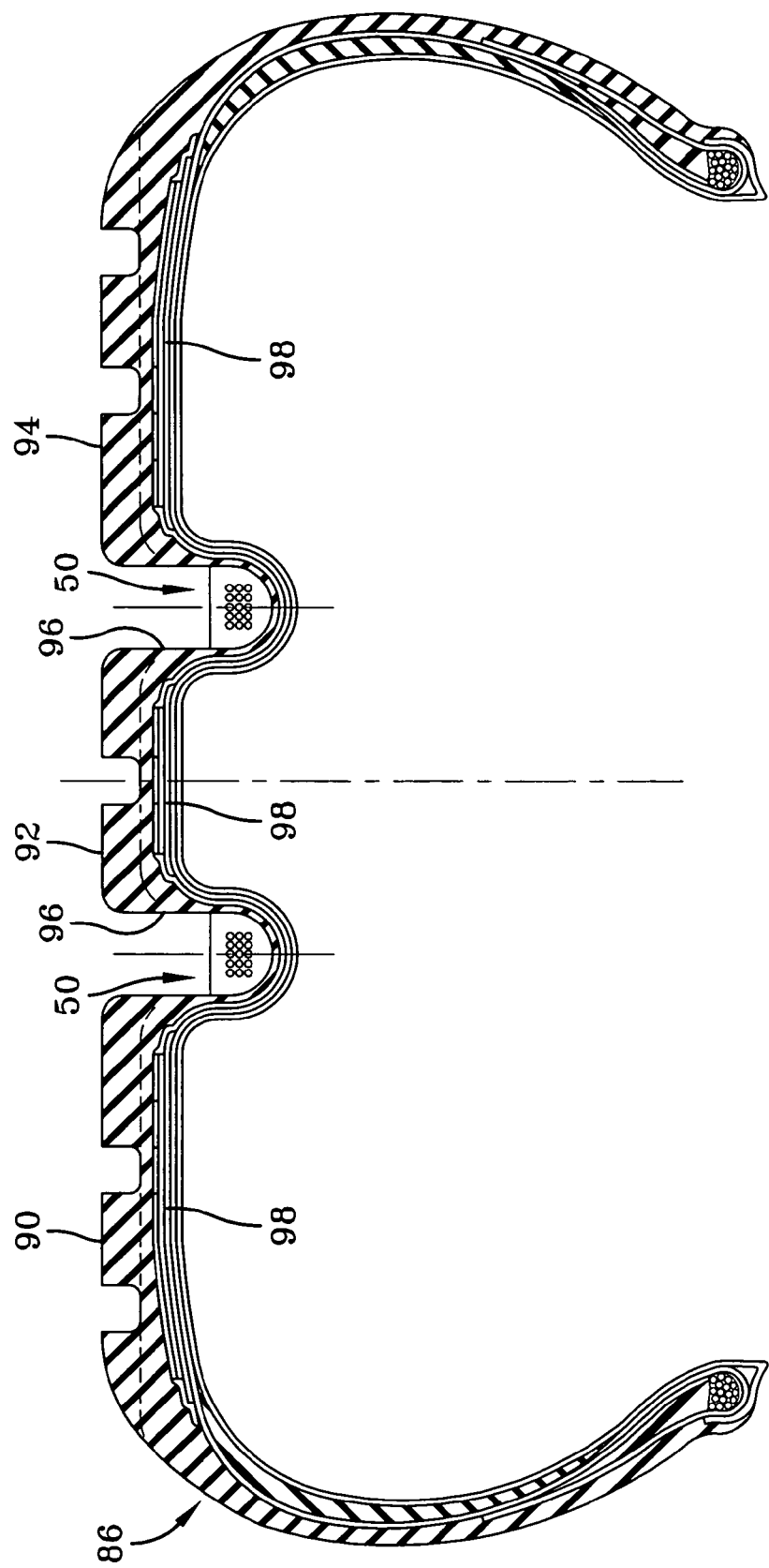
FIGS. 8 and 9 are other alternative constructions of the tire.

FIG. 8 is another embodiment of the tire. The tire 86 has a tread portion 88 divided into three tread sections 90, 92, 94 by two deep circumferentially extending grooves 96. Such a tire 86 is suitable when the tire has a relatively wide tread width. The grooves 96 are formed similar to the manner discussed above, the green tread being provided with multiple thin sections. A separately molded ring 50 is located in each groove 96. Each tread section 90, 92, 94 is reinforced by a separate belt structure 98.

Figure 9:
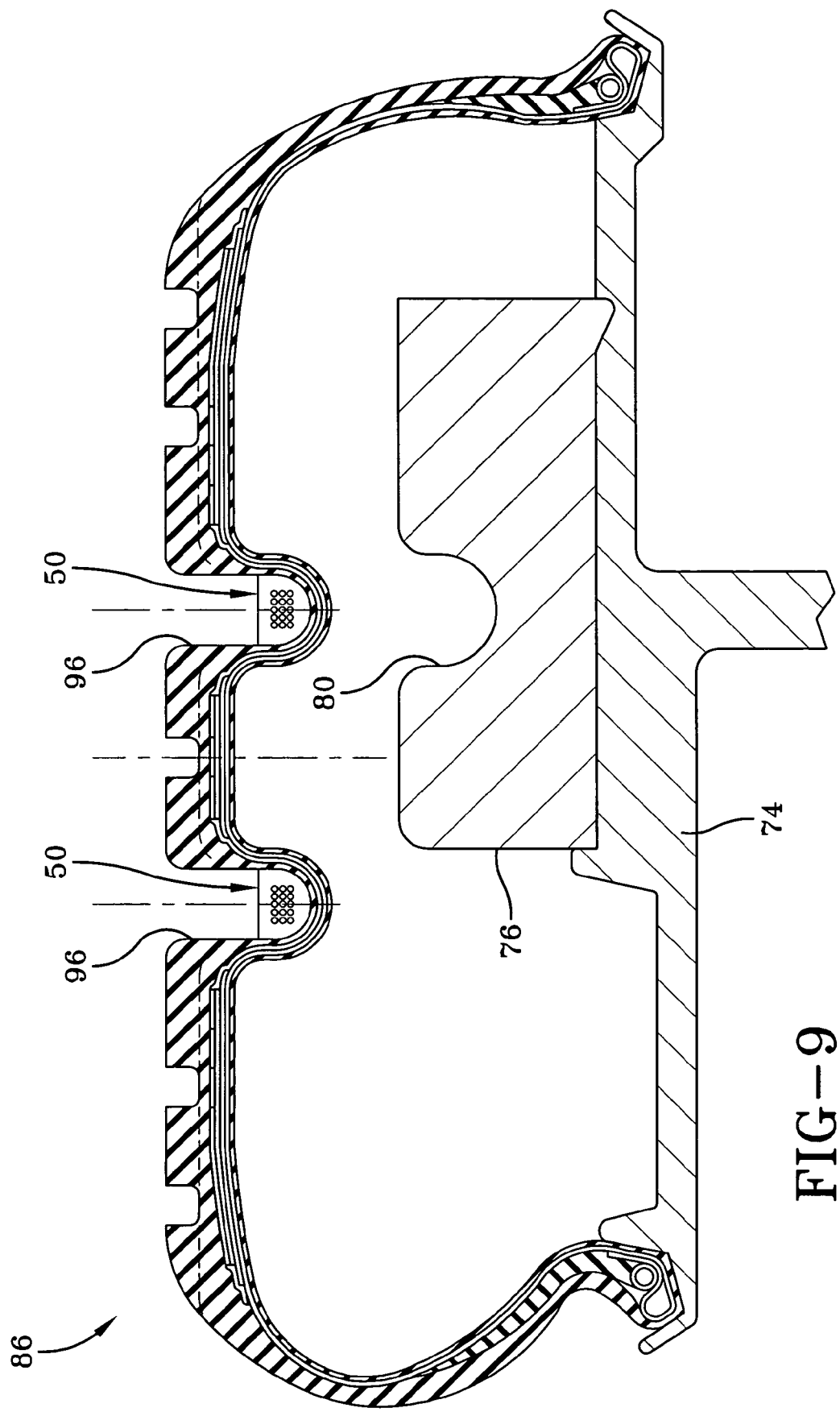

While discussed individually, various combinations of the illustrated embodiments are contemplated by the inventor. For example, the self-supporting tire of FIG. 6 may be provided with multiple deep circumferentially extending grooves as shown in FIG. 8. The tire of FIG. 7 may be provided with multiple deep circumferentially extending grooves, see FIG. 9. When the support ring 76 is offset from the center of the wheel rim 74, one tire groove 96 may be located so as to be adjacent to the side of the support ring 76 when the tire is operated in a low pressure condition; such a construction would assist in keeping the tire in a desired location relative to the ring. The other tire groove 96 is aligned with the groove 80 in the support ring 76. If the support ring 76 is centered on the wheel, the support ring 76 may be provided with multiple grooves 80 to correspond to the tire grooves 96.

What is claimed is:

1. A radial ply pneumatic tire assembly comprising a cured tire and a cured circumferentially extending ring, the tire comprising:
   a) an annular tread, the tread having at least one circumferentially extending groove and a pair of lateral tread edges, the axial distance between the lateral tread edges defining the tread width,
   b) at least one pair of reinforcing belts located radially inwardly of the tread,
   c) a pair of sidewalls, each sidewall extending radially inwardly from each lateral tread edge, and
   d) a tire carcass structure comprising a pair of bead cores, each bead core being located radially inwardly from each sidewall, and a carcass reinforcing structure radially inward of the reinforcing belts extending circumferentially about the tire from one of the pair of bead cores to the other one of the pair of bead cores, the carcass reinforcing structure having at least one ply, each ply having a pair of turnup ends; and the ring being manufactured and cured separately from the cured tire and comprising a coated inextensible material, the circumferentially extending ring being placed in the at least one circumferentially extending grooves of the cured tire wherein, in the tire assembly, the ring is radially inward of the at least one pair of reinforcing belts.

2. The tire assembly according to claim 1, the tire further comprising:
   e) an interior cavity, wherein the at least one circumferentially extending groove extends into the interior cavity by a depth D of 10-30% of the tire sectional height H.

3. The tire assembly of claim 1, the tire further comprising:
   e) at least a pair of fillers, each filler being located in each sidewall and extending from a location radially inward of the lateral tread edges to radially outward of the bead cores.

4. The tire assembly of claim 1, wherein each turnup end of the carcass reinforcing ply passes radially inward of the bead core and extends radially outward adjacent to the carcass reinforcing ply.

5. The tire assembly of claim 1 wherein the tread has at least two circumferentially extending grooves, and a circumferentially extending ring in each circumferentially extending groove, the ring in each groove being radially inward of the at least one pair of reinforcing belts.

6. The tire assembly of claim 5 wherein the tire has three sets of reinforcing belts, each of the sets of reinforcing belts being separated by one of the circumferentially extending grooves.

7. The tire assembly of claim 1 wherein the circumferentially extending ring is comprised of a material selected from the group consisting of thermoplastic, thermoelastomer, or plasticized elastomer.

8. The tire assembly of claim 1 wherein the inextensible material of the circumferentially extending ring is selected from the group consisting of steel, carbon fiber, fiberglass, aramid, a nylon, or a polyester.

9. The tire assembly of claim 1 wherein the circumferentially extending ring is comprised of reflective or fluorescent materials that are seen on the radially outer surface of the circumferentially extending ring.

10. The tire assembly of claim 1 wherein the circumferentially extending ring has a radially outer surface, the radially outer surface being provided with a grooving pattern.

11. The tire assembly of claim 1 wherein the circumferentially extending ring has a filled in U-shaped cross-sectional configuration.

* * * * *